United States Patent
Morrill

(10) Patent No.: US 8,868,058 B2
(45) Date of Patent: Oct. 21, 2014

(54) UNIVERSAL NEAR FIELD SELF-CONFIGURING FEMTOCELL

(71) Applicant: CenturyLink Intellectual Property LLC, Denver, CO (US)

(72) Inventor: Robert J. Morrill, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 29 days.

(21) Appl. No.: 13/689,892

(22) Filed: Nov. 30, 2012

(65) Prior Publication Data
US 2014/0155046 A1 Jun. 5, 2014

(51) Int. Cl.
*H04M 3/00* (2006.01)
*H04W 88/10* (2009.01)

(52) U.S. Cl.
CPC .................................. *H04W 88/10* (2013.01)
USPC ......................................... 455/418; 370/310

(58) Field of Classification Search
USPC ................ 455/418, 422.1, 446; 370/310, 254
See application file for complete search history.

(56) References Cited

U.S. PATENT DOCUMENTS

| | | | |
|---|---|---|---|
| 2007/0079113 A1* | 4/2007 | Kulkarni et al. | 713/150 |
| 2009/0059822 A1* | 3/2009 | Morrill et al. | 370/310 |
| 2009/0061924 A1* | 3/2009 | Morrill et al. | 455/552.1 |
| 2009/0296641 A1* | 12/2009 | Bienas et al. | 370/329 |
| 2010/0234004 A1* | 9/2010 | Sweeney et al. | 455/415 |
| 2011/0004747 A1* | 1/2011 | Venkatachalam | 713/2 |
| 2011/0045835 A1* | 2/2011 | Chou et al. | 455/446 |
| 2011/0207461 A1* | 8/2011 | Lundqvist et al. | 455/436 |
| 2012/0046025 A1* | 2/2012 | Das et al. | 455/422.1 |
| 2012/0052793 A1* | 3/2012 | Brisebois et al. | 455/1 |
| 2013/0223284 A1* | 8/2013 | Davies et al. | 370/254 |

\* cited by examiner

*Primary Examiner* — Nathan Taylor
(74) *Attorney, Agent, or Firm* — Swanson & Bratschun, L.L.C.

(57) ABSTRACT

Embodiments of the present invention include a method for configuring a femtocell. In one embodiment, the method includes identifying a cellular device within near-field communication range of the femtocell. The method identifies a carrier network associated with the cellular device and automatically configures the femtocell to operate on the carrier network associated with the cellular device.

19 Claims, 3 Drawing Sheets

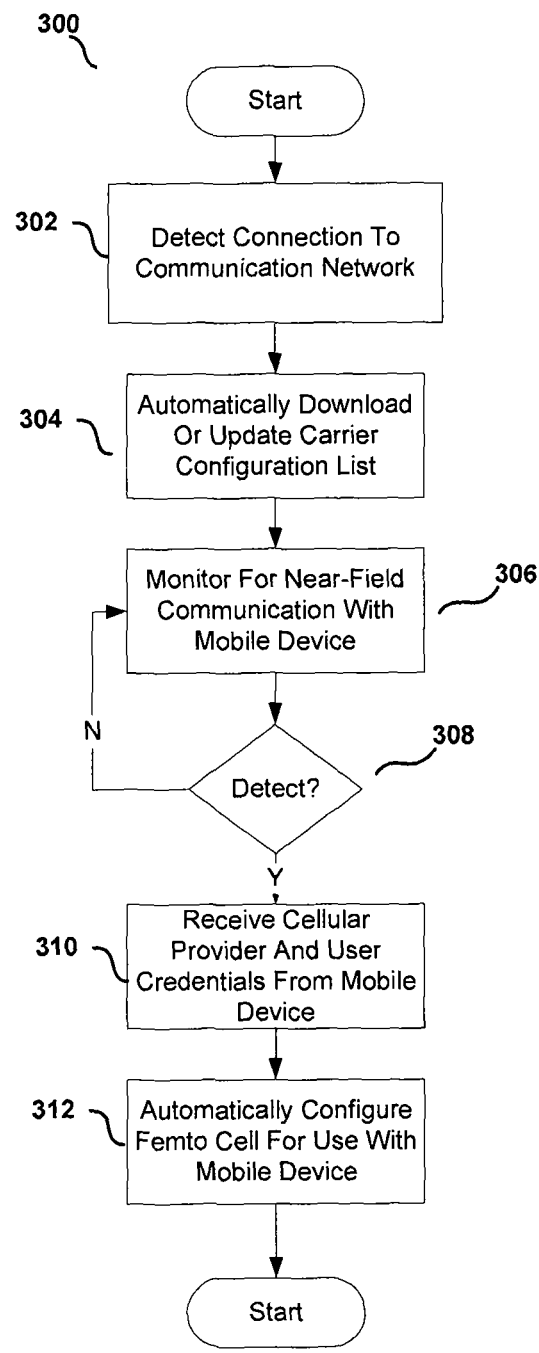

UNIVERSAL NEAR FIELD SELF-CONFIGURING FEMTOCELL

BACKGROUND OF THE INVENTION

1. Field of the Invention

The principles of the present invention relate generally to an improved telecommunications system, and in particular, to an improved configuration of a telecommunications system for wireless communications. Still more particularly, the principles of the present invention relate to a universal near field self-configuring femtocell, and method and computer usable program product for using said universal femtocell.

2. Description of the Related Art

Wireless communication devices, such as with a wireless phone or a cellular phone, utilize a communication network comprising antenna towers. An antenna tower is a radio frequency antenna mounted on a tower, or other mounting structure, such as a side of a building. An antenna tower sends and receives wireless signals to and from a wireless communication device to facilitate wireless communication. The antenna tower includes equipment called Base Transceiver Station (BTS) that uses the antenna tower for facilitating radio communication with wireless communication devices. The BTS communicates with other equipment on a wireless carrier's network to facilitate communications.

A wireless communication device has to be in proximity of an antenna tower to use the wireless communication services of a wireless carrier. Power of the BTS and the design of the wireless network determine the distance from the antenna tower at which a wireless communication device can establish communication with the antenna tower. A wireless carrier/service provider plans the locations of antenna towers such that radio communications between wireless communication devices and the antenna tower covers an intended area. The area within a coverage region that is covered by a particular antenna tower is called a cell. Generally, the cell design is intended to provide coverage at all locations within each cell. However, as consumers of wireless services are familiar, areas within a cell called dead zones can experience limited or no coverage, resulting in failed or interrupted wireless communication, or wireless communication of less than desirable quality.

As a solution to these problems, wireless carriers configure smaller cells within a cell's dead zone. For example, wireless carriers may install a pico cell or a femtocell, which is a radio communications device that improves cellular coverage in the dead zones. A femtocell includes the functionality of a BTS, an antenna tower, and certain other equipment in the wireless communication network. In essence, a femtocell is miniature self-contained antenna tower that utilizes an Internet connection to provide the backhaul connection.

Currently, the location and configuration of a femtocell is carrier determined so that the particular femtocell may operate on the wireless carrier's wireless communication network. Femtocells should not be confused with wireless access points that utilize wireless LAN technologies such as IEEE 802.11a/b/g/n (i.e., Wi-Fi® technology) because femtocells are configured to operate using the same frequency and protocols as the macro wireless carrier networks. In addition, femtocells participate in the wireless carriers coverage plans, including identifying other nearby towers, adjusting their transmit power requirements accordingly, and performing inter-tower call hand-off.

To enable a user to configure a femtocell according to the user's choice of location and the user's choice of wireless carrier, the illustrative embodiments provide a universal near-field self-configuring femtocell that may be placed and configured in accordance with a user desired location and carrier network.

BRIEF SUMMARY OF THE INVENTION

Embodiments of the present invention include an apparatus, method, and computer program product associated with a universal near field self-configuring femtocell. For example, the disclosed embodiments include a universal near field self-configuring femtocell that includes a near-field-transceiver capable of near-field communication with a cellular device. The universal near field self-configuring femto includes memory in communication with a processing unit. The memory stores computer usable program code. The processing unit is configured to execute the computer usable program code to identify the cellular device in response to the cellular device being within a near-field communication range of the femtocell. The universal near field self-configuring femto identifies a carrier network associated with the cellular device. The universal near field self-configuring femto then automatically configures the femtocell to operate on the carrier network associated with the cellular device.

In another embodiment, a method, implemented on a machine having at least one processor, storage, and a communication platform for configuring a femtocell is disclosed. The method includes identifying a cellular device within near-field communication range of the femtocell; identifying a carrier network associated with the cellular device; and automatically configuring the femtocell to operate on the carrier network associated with the cellular device.

The embodiments of the present invention also include a computer program product comprising computer executable instructions embodied in a tangible computer-readable medium, the computer executable instructions comprising instructions to identify a cellular device in response to the cellular device being within a near-field communication range of a femtocell; identify a carrier network associated with the cellular device; and automatically configure the femtocell to operate on the carrier network associated with the cellular device.

The above embodiments may be further modified as described below. In addition, additional advantages and novel features will be set forth in part in the description that follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE SEVERAL VIEWS OF THE DRAWINGS

For a more complete understanding of the present application, the objects and advantages thereof, reference is now made to the following descriptions taken in conjunction with the accompanying drawings, in which:

FIG. 3 depicts an embodiment of a process performed by the universal near field self-configuring femtocell for configuring said femtocell.

DETAILED DESCRIPTION OF THE INVENTION

Figure 1:
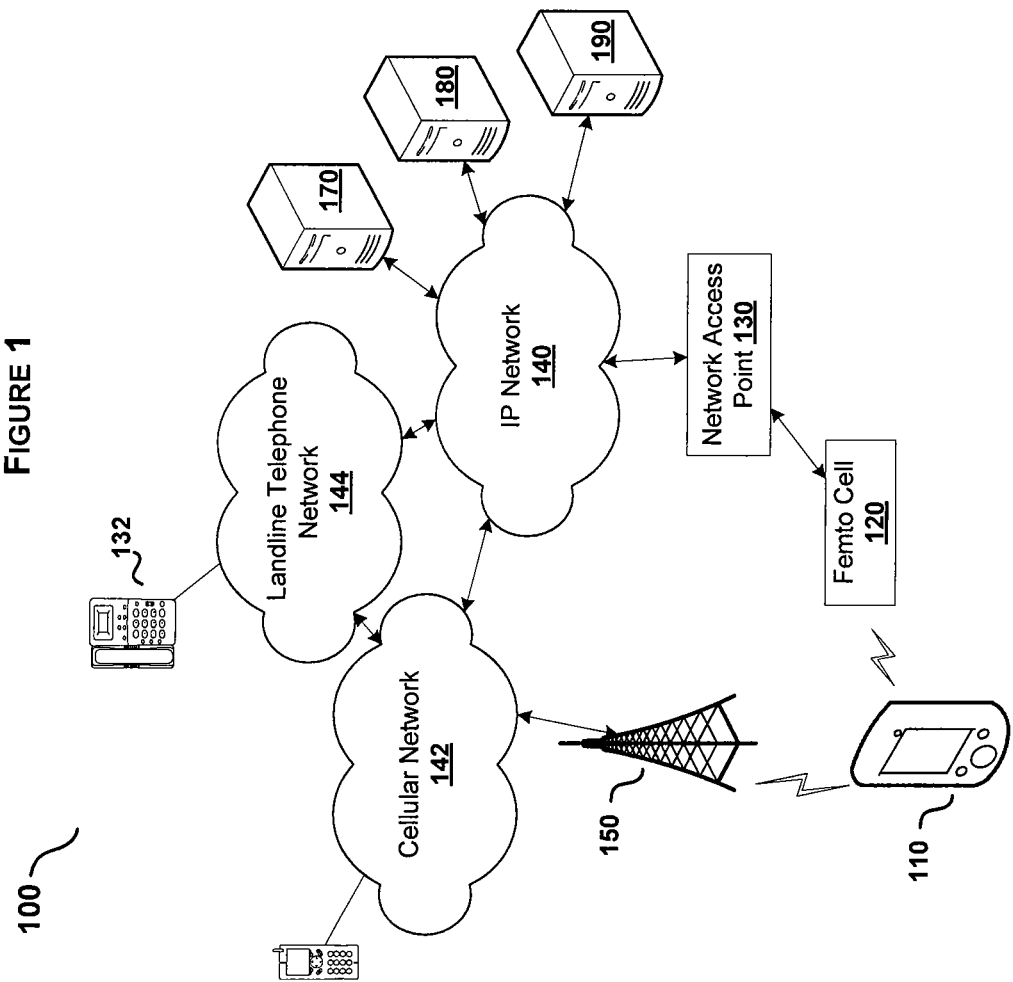
FIG. 1 depicts an embodiment of a network environment in which the illustrative embodiments may be implemented.
Figure 2:
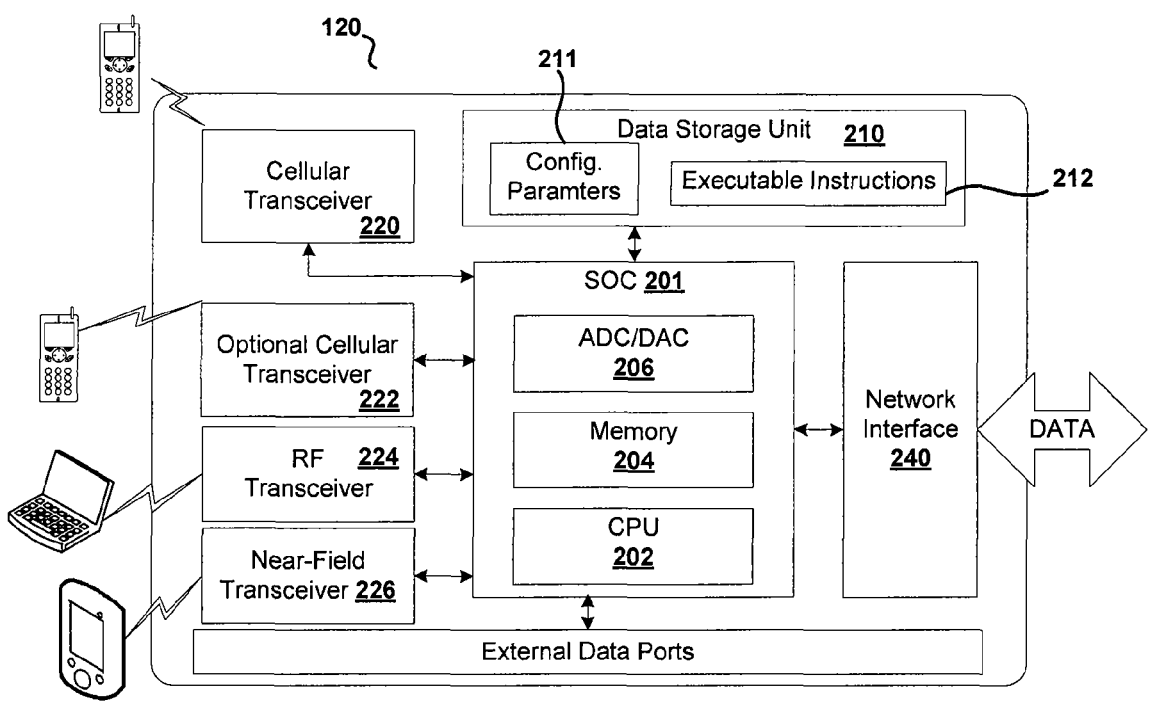
FIG. 2 depicts an embodiment of a universal near field self-configuring femtocell in accordance with the illustrative embodiments.

The disclosed embodiments and advantages thereof are best understood by referring to FIGS. 1-3 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

FIG. 1 depicts a network environment 100 in which a universal self-configuring femtocell 120 may be implemented in accordance with the disclosed embodiments. The universal self-configuring femtocell 120 is a small cellular telecommunications base station that can be installed in residential or business environments (e.g., business buildings, train/bus stations, and airports) either as single stand-alone item or in clusters to provide improved cellular coverage within a building or any desired area, along with the possible provisioning of additional services. Additionally, the universal self-configuring femtocell 120 may be installed in other nonresidential locations that require, or would benefit from, the use of a femtocell for providing or improving cellular services. For example, in certain embodiments, the universal self-configuring femtocell 120 may be installed on or incorporated within a car, bus, train, and/or airplane.

Although the specification utilizes the term "femtocell", the disclosed embodiments are not limited to just femtocells, but are applicable to all types of "small cell" devices including, but not limited to, femtocells, picocells, and microcells. Thus, the term "femtocell" as utilized herein is intended to cover all such devices.

Once the universal self-configuring femtocell 120 is properly configured, a cellular device 110 may communicate with the universal self-configuring femtocell 120 for providing cellular communication to the cellular device 110. The cellular device 110 may be any type of communication device operable to send and receive cellular communication signals for communicating either voice or any type of data communication. Examples of communication devices include, but are not limited to, regular cellular phones, smartphones, tablets, laptops, personal digital assistants (PDAs), or any other type of computing or communication device. In some embodiments, the cellular device 110 may also have wireless data capability (e.g., Wi-Fi®) to communicate with other mobile devices and/or computing devices over the Internet.

As illustrated in FIG. 1, the cellular device 110 may also communicate with a macro cellular network 142 via a base station tower 150 for facilitating cellular communication as known in the art. The macro cellular network 142 may include one or more cellular networks of one or more carrier/service providers and may support a plurality of cellular frequencies and network technology including, but not limited to, Global System for Mobile Communications (GSM), Code-Division Multiple Access (CDMA), 3G, and 4G networks such as, but not limited to, a long-term evolution (LTE) network. The macro cellular network 142 may also receive and route communications over a landline telephone network 144 and an IP Network 140.

The landline telephone network 144 may include a public switched telephone network (PSTN) for facilitating voice communication to landline telephone devices, such as, landline telephone 132. The public switched telephone network is the standard analog telephone network utilized by most homes. The landline telephone network 144 may also include digital telephone networks, such as, but not limited to, an integrated services digital network (ISDN), xDSL (where x stands for various DSL technologies such as ADSL, VDSL2. etc.), and Fiber to Premise solutions such as Gigabit-capable Passive Optical Networks (GPON) and Ethernet Passive Optical Networks (EPON).

The IP network 140 may include one or more data networks, such as, but not limited to, the Internet, for routing communications between one or more communication devices and/or data processing systems 170, 180, and 190. The Internet is a global system of interconnected computer networks that interchange data using the standardized Internet Protocol Suite (TCP/IP). Additionally, IP network 140 may include other types of data networks, such as, but not limited to, an intranet, a private local area network (LAN), a wide area network (WAN), and a wireless local area network (WLAN).

As described above, in certain areas, it may be desirable or necessary for the cellular device 110 to communicate with the universal self-configuring femtocell 120 for receiving cellular services as opposed to directly communicating over the base station tower 150. In order to link the universal self-configuring femtocell 120 with the macro cellular network 142, the universal self-configuring femtocell 120 backhauls that communication over the IP Network 140 using a user's DSL, Cable, FIOS, or other Internet link. For example, in one embodiment, the universal self-configuring femtocell 120 may connect to a network access point 130, such as, but not limited to, a broadband router, which in turn provides a connection to the IP Network 140. Alternatively, in certain embodiments, the universal self-configuring femtocell 120 may incorporate the components of a router and/or wireless access point and be directly coupled the IP Network 140. A mobile telecommunications service provider core network gateway provides the link from the IP Network 140 into the macro cellular network 142.

As an example, FIG. 2 depicts a simplified block diagram of a universal self-configuring femtocell 120 that may be employed in accordance with the disclosed embodiments. In the depicted embodiment, the universal self-configuring femtocell 120 includes a system-on-a-chip (SoC) 201 that integrates all or a majority of the components of the universal self-configuring femtocell 120 on single chip. For example, the SCO 201 may include, but not limited to, one or more processors/microprocessors 202, memory 204, and an analog-to-digital converter (ADC) and a digital-to-analog converter (DAC) 206 for converting between analog signals and digital format. Alternative embodiments may incorporate one or more these components as separate stand-alone elements.

The universal self-configuring femtocell 120 may also include one or more data storage unit 210, such as, but not limited to, a hard disk drive for storing executable instructions 212. The data storage unit 210 may store other data, such as, but not limited to, access rules, routing tables, quality of service (QoS) rules for intelligent routing, and configuration parameters 211 for self-configuring the universal self-configuring femtocell 120 for enabling cellular communication, as further described below.

The universal self-configuring femtocell 120 includes a network interface 240. The network interface 240 may be a network interface card, such as, but not limited to, a modem, an Ethernet card, a wireless network interface card, and/or other means enabling the universal self-configuring femtocell 120 to connect to the IP network 140.

The universal self-configuring femtocell 120 includes a cellular transceiver 220 for communicating cellular signals between the universal self-configuring femtocell 120 and one or more cellular devices. In some embodiments, the universal self-configuring femtocell 120 may include multiple cellular transceivers, such as an optional cellular transceiver 222. In these embodiments, each cellular transceiver may be configured to operate with cellular devices associated with different carrier/service provider network. However, as will be further described, in certain embodiments, the universal self-configuring femtocell 120 may be configured to simultaneously provide or be quickly reconfigured to provide cellular service to cellular devices associated with different carrier/service provider networks using a single cellular transceiver. For instance, in certain embodiments, in addition to and/or in lieu of the optional cellular transceiver 222, the primary transceiver (e.g., cellular transceiver 220) may be a 'Software Defined' type, that is programmable to support multiple carriers.

Additionally, the universal self-configuring femtocell 120 may include a radio frequency (RF) transceiver 224 for enabling Wi-Fi or other wireless data communication with one or more devices. In an alternative embodiment, a portion or all of the components of the universal self-configuring femtocell 120 may integrated within a Wi-Fi access point and configured for a carrier specific network in accordance with the disclosed embodiments. In certain embodiments, the radio communications can be directed by the femtocell to be either cellular or Wi-Fi depending upon the carrier specific configuration. In addition, in some embodiments, the carrier specific configuration may install a carrier specific SSID or other carrier specific configuration settings.

In the depicted embodiment, the universal self-configuring femtocell 120 also includes a near-field (NF) transceiver 226. The NF transceiver 226 is configured to detect and enable close range communication and data transfer between the universal self-configuring femtocell 120 and other devices such as, but not limited to, the cellular device 110. The NF transceiver 226 may support multiple frequencies (e.g., 13.56 MHz and 27.12 MHz) and incorporate internal memory for handling large data transfers. The NF transceiver 226 may be configured to perform active and/or passive target operations. The particular distance of operation may depend on which protocol the NF transceiver 226 is configured with, but generally the distance is relatively short (e.g., less than 4 inches). However, the disclosed embodiments are not limited to a specific distance. In certain embodiments, the NF transceiver 226 may be physically separated from the universal self-configuring femtocell 120 and communicate with the universal self-configuring femtocell 120 either wirelessly or via cable. One advantage of having a separate near field transceiver is to allow for easier user configurations when the femtocell is installed on a high ceiling or similar situation where the user cannot easily get within near field range of the universal self-configuring femtocell 120.

Referring now to FIG. 3, a flowchart is presented depicting a method 300 performed by the universal self-configuring femtocell 120 for self-configuring itself to be able to communicate with a particular carrier network based on detection of a near field cellular device in accordance with an embodiment of the invention. The method 300 starts, at step 302, by detecting a connection to the communications network, such as IP network 140. This occurs when a user plugs the universal self-configuring femtocell 120 into a power outlet and connects the network interface component of the universal self-configuring femtocell 120 to the Internet to provide the backhaul connection.

Once the Internet connection is establish, the universal self-configuring femtocell 120 includes instructions for automatically contacting a network server (e.g., data processing system 190 as illustrated in FIG. 1) to automatically download or update a carrier configuration list at step 304. In an alternative embodiment, a carrier configuration list may be pre-stored in the universal self-configuring femtocell 120 and utilized without attempting to first update. The carrier configuration list includes parameters for enabling the universal self-configuring femtocell 120 to register with one or more carrier networks. Examples of the types of parameters included in the carrier configuration list includes RF channel information (frequencies for uplink and downlink), scrambling codes, service area code, neighbor list, physical cell ID, RF parameters including pilot and maximum RF power. The particular network carrier will be determined based on the respective carrier network associated with a cellular device.

For instance, in one embodiment, the method, at step 306, monitors for near-field communication from a cellular device. The universal self-configuring femtocell 120 may be configured as an active device that sends out signals and receives back information for identifying nearby cellular devices. The universal self-configuring femtocell 120 may also receive a signal from a nearby cellular device and send back information. In certain embodiments, a user may tap a cellular device against the universal self-configuring femtocell 120 for identifying and initiating a configuration process by the universal self-configuring femtocell 120.

In response to identifying a nearby cellular device, the universal self-configuring femtocell 120, at step 310, requests information from the cellular device in order to identify and configure the cellular device to operate with a carrier network associated with the cellular device. Alternatively, the cellular provider information may automatically be pushed to the universal self-configuring femtocell 120 by the cellular device. The cellular provider information may include a service provider identifier, a user credential, and/or a device identifier, in addition to other information. Based on the received information, the universal self-configuring femtocell 120, at step 312, identifies the particular carrier network associated with the cellular device, retrieves the configuration parameters associated with the particular carrier network from the stored configuration data, and automatically configures the universal self-configuring femtocell 120 for use with the identified network. Alternatively, in some embodiments, in response to identifying a particular carrier network associated with the cellular device, the universal self-configuring femtocell 120 may be configured to contact a configuration server associated with the identified carrier network for retrieving the parameters for establishing communications with the carrier network. Still, in some embodiments, the universal self-configuring femtocell 120 may be configured with a carrier template of the core carrier specific software. In response to detecting a network connection and/or in response to identifying a nearby cellular device, the universal self-configuring femtocell 120 executes the core carrier specific software and determines whether there are carrier specific software updates (and if so, downloads them), and provides user specific configuration information from the network servers.

Additionally, in certain embodiments, the universal self-configuring femtocell 120 may provide an acknowledgment message to the cellular device indicating that the universal self-configuring femtocell 120 has been properly configured to operate with the cellular device.

Thus, the disclosed embodiments enable a self-configuring femtocell using near field communication for configuring the femtocell to operate on a particular carrier network associated with a nearby cellular device. The above process may be repeated to reconfigure the universal self-configuring femtocell 120 to operate with a different carrier network as needed. In one embodiment, prior to reconfiguring, the universal self-configuring femtocell 120 may send a prompt to the user device to verify that the user desires to reconfigure the universal self-configuring femtocell 120. The prompt may include a message indicating which device last utilized the universal self-configuring femtocell 120 and time/date of last use for enabling the user to decide whether to initiate reconfiguring of the universal self-configuring femtocell 120. Of course, in certain embodiments, the universal self-configuring femtocell 120 may automatically reconfigure without any user notification or input.

In addition, as described in FIG. 2, the universal self-configuring femtocell 120 may include additional cellular transceivers. In one embodiment, the universal self-configuring femtocell 120 may simultaneously be configured to operate with multiple carrier networks for enabling communication to cellular devices operating on different carrier networks utilizing the additional cellular transceivers. Alternatively, in some embodiments, each of the cellular transceivers may be preconfigured to operate with a particular carrier network. Thus, in response to identifying a particular carrier network associated with a cellular device, the universal self-configuring femtocell 120 may simple power on, select, or initiate a corresponding cellular transceiver for the particular carrier network.

Still, in certain embodiments, the universal self-configuring femtocell 120 may be configured to support near simultaneous communication on multiple carrier networks utilizing a single cellular transceiver by creating a virtualized femtocell. For instance, in certain embodiments, the universal self-configuring femtocell 120 may be configured to quickly switch between the communication parameters of a first carrier network and a second carrier network for providing communication to at the same time that are associated with different carrier networks. The universal self-configuring femtocell 120 may utilize a round-robin approach for switching between the different protocols and/or may use an intelligent approach that switches between the different communication protocols based on detected voice activity. Thus, in these embodiments, a femtocell having a single cellular transceiver is capable of providing near simultaneous communication to multiple devices that operate on different carrier networks.

As will be appreciated by one skilled in the art, the disclosed embodiments may be embodied as a system, apparatus, method, or as a computer program product. Accordingly, the disclosed embodiments may be implemented entirely with hardware, or as a software embodiment (including firmware, resident software, micro-code, etc.), or as an embodiment combining software and hardware aspects that may all generally be referred to herein as a "circuit," "module" or "system."

Furthermore, the computer program product may be embodied in any tangible medium of expression having computer-usable program code embodied in the medium. Computer program code for carrying out operations of the present invention may be written in any combination of one or more programming or machine languages. The program code may execute entirely or partially on one or more local or remote devices. In the latter scenario, the remote devices may be connected through any type of network, including a local area network (LAN) or a wide area network (WAN), or the connection may be made to an external computer (for example, via the Internet). Additionally, the computer program product may be embodied in a flash memory drive or other external storage device, and connected to a device via a data port (e.g., a USB port) and/or communication port (e.g., Ethernet port) for execution of the program code.

The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated. The scope of the claims is intended to broadly cover the disclosed embodiments and any such modification.

In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A universal near field self-configuring femtocell comprising:
   a near-field-transceiver capable of near-field communication with a cellular device;
   a cellular transceiver;
   memory in communication with a processing unit, the memory including computer usable program code, and
   the processing unit executing the computer usable program code to:
      identify the cellular device in response to the cellular device being within a near-field communication range of the femtocell, wherein the femtocell is configured to operate with multiple carrier networks simultaneously for enabling communication to cellular devices operating on different carrier networks;
      identify a carrier network associated with the cellular device; and
      automatically configure the femtocell to operate on the carrier network associated with the cellular device.

2. The universal near field self-configuring femtocell of claim 1, wherein the processing unit executes the computer usable program code to contact a configuration server for retrieving configuration parameters for establishing communications with the carrier network.

3. The universal near field self-configuring femtocell of claim 1, wherein the processing unit executes the computer usable program code to pre-stored configuration parameters for establishing communications with the carrier network.

4. The universal near field self-configuring femtocell of claim 1, further comprising a second cellular transceiver, wherein the processing unit executes the computer usable program code to configure the femtocell to operate on a second carrier network using the second cellular transceiver.

5. The universal near field self-configuring femtocell of claim 1, wherein the processing unit executes the computer usable program code to configure the femtocell to operate on both a second carrier network and the carrier network utilizing the cellular transceiver.

6. The universal near field self-configuring femtocell of claim 2, wherein the processing unit executes the computer usable program code to contact the configuration server for retrieving configuration parameters for establishing communications with the carrier network in response to identifying the carrier network associated with the cellular device.

7. A computer program product comprising computer executable instructions embodied in a non-transitory computer-readable medium, the computer executable instructions comprising instructions to:
   identify a cellular device in response to the cellular device being within a near-field communication range of a femtocell, wherein the femtocell is configured to operate with multiple carrier networks simultaneously for enabling communication to cellular devices operating on different carrier networks;
   identify a carrier network associated with the cellular device; and
   automatically configure the femtocell to operate on the carrier network associated with the cellular device.

8. A method for configuring a femtocell, the method comprising:
   identifying a cellular device within near-field communication range of the femtocell, wherein the femtocell is configured to operate with multiple carrier networks simultaneously for enabling communication to cellular devices operating on different carrier networks;
   identifying a carrier network associated with the cellular device; and
   automatically configuring the femtocell to operate on the carrier network associated with the cellular device.

9. The method of claim 8, further comprising:
   requesting cellular provider information from the cellular device for identifying the carrier network associated with the cellular device.

10. The method of claim 8, further comprising:
    automatically receiving cellular provider information from the cellular device for identifying the carrier network associated with the cellular device.

11. The method of claim 10, wherein the cellular provider information includes a service provider identifier and a user credential.

12. The method of claim 8, wherein automatically configuring the femtocell to operate on the carrier network associated with the cellular device is performed using pre-stored configuration parameters associated with the carrier network.

13. The method of claim 8, further comprising contacting a configuration server for retrieving configuration parameters for establishing communications with the carrier network.

14. The method of claim 13, wherein contacting the configuration server for retrieving configuration parameters for establishing communications with the carrier network is performed in response to identifying the carrier network associated with the cellular device.

15. The method of claim 13, wherein contacting the configuration server for retrieving configuration parameters for establishing communications with the carrier network is performed in response to the femtocell detecting a connection to a communications network.

16. The method of claim 8, wherein identifying the cellular device within near-field communication range of the femtocell includes identifying the cellular device in response to receiving a tap from the cellular device.

17. The method of claim 8, further comprising providing an acknowledgment message to the cellular device indicating that the femtocell has been properly configured to operate with the cellular device.

18. The method of claim 8, further comprising automatically reconfiguring the femtocell to operate on a second carrier network associated with a second cellular device within near-field communication range of the femtocell.

19. The method of claim 18, wherein the femtocell virtualizes communication on the second carrier network using a single cellular transceiver.

* * * * *